United States Patent [19]
Trefz et al.

[11] Patent Number: 5,048,853
[45] Date of Patent: Sep. 17, 1991

[54] FOUR-WHEEL STEERING VEHICLE APPARATUS

[75] Inventors: Harlan J. Trefz; John N. Lesikar, both of Jackson, Tenn.

[73] Assignee: Noma Outdoor Products, Inc., Jackson, Tenn.

[21] Appl. No.: 630,875

[22] Filed: Dec. 20, 1990

Related U.S. Application Data

[63] Continuation of Ser. No. 409,574, Sep. 19, 1989, abandoned.

[51] Int. Cl.⁵ .............................................. B62D 7/15
[52] U.S. Cl. ........................................ 280/91; 74/497
[58] Field of Search ...................... 280/91, 98, 99, 100; 74/110, 497

[56] References Cited

U.S. PATENT DOCUMENTS

| 846,606 | 3/1907 | Patterson et al. | 280/99 |
| 1,951,147 | 3/1934 | Greist | 280/91 |
| 2,319,880 | 5/1943 | Pulleyblank | 280/91 |
| 2,765,650 | 10/1956 | Youngclaus | 280/100 |
| 3,110,352 | 11/1963 | McClarnon | 280/91 |
| 3,198,541 | 8/1965 | Christenson et al. | 280/91 |
| 3,351,147 | 11/1967 | Williamson | 180/6.3 |
| 3,669,202 | 6/1972 | Andersen | 280/102 |
| 4,223,611 | 9/1980 | Dawson et al. | 180/140 |
| 4,467,885 | 8/1984 | Furukawa et al. | 180/140 |
| 4,588,039 | 5/1986 | Uno et al. | 180/140 |
| 4,592,439 | 6/1986 | Collard et al. | 180/140 |
| 4,621,702 | 11/1986 | Kanazawa et al. | 180/140 |
| 4,941,672 | 7/1990 | Godin | 280/91 |

Primary Examiner—Andres Kashnikow
Assistant Examiner—Eric Culbreth
Attorney, Agent, or Firm—G. Brian Pingel

[57] ABSTRACT

A four-wheel steering apparatus for a vehicle includes assemblies for steering the front and rear wheels of the vehicle, and an interconnecting member for connecting the front and rear steering assemblies together to move in relation to one another such that there is a dwell period between movement of the front and rear steering assemblies. The interconnecting member is operated by a driver of the vehicle and the dwell period extends between the time when the movement of the front-wheel steering assembly begins and the time when the movement of the rear-wheel steering assembly begins.

4 Claims, 3 Drawing Sheets

FOUR-WHEEL STEERING VEHICLE APPARATUS

This is a continuation of application Ser. No. 409,574, filed Sept. 19, 1989, now abandoned.

BACKGROUND OF THE INVENTION

1. Field of the Invention

This invention relates in general to a four-wheel steering apparatus for relatively slow moving vehicles, and more specifically relates to such apparatus that varies, such as riding lawnmowers at certain times, steering of the rear-wheels with respect to the steering of the front-wheels.

2. Description of the Prior Art

To provide vehicles with better maneuverability, it is recognized that four-wheel steering is highly advantageous. A variety of four-wheel steering systems for vehicles are known in the art as disclosed by the following patents: Williamson, U.S. Pat. No. 3,351,147; Andersen, U.S. Pat. No. 3,669,202; Dawson, et al, U.S. Pat. No. 4,223,611; Christenson, et al, U.S. Pat. No. 3,198,541; Furukawa, et al, U.S. Pat. No. 4,467,885; Uno, et al, U.S. Pat. No. 4,588,039; Collard, et al, U.S. Pat. No. 4,592,439; and Kanazawa, et al, U.S. Pat. No. 4,621,702.

The above listed patents disclose a variety of four-wheel steering systems for vehicles. For example, in the Kanazawa, et al "702" patent a four-wheel steering system is disclosed that steers the rear wheels in a reverse direction from that of the front wheels at low speeds to enhance the turning capability of the vehicle. Although the system described in the "702" patent appears to be useful in connection with vehicles such as automobiles, such system is not designed to meet the operating conditions of low speed vehicles such as riding lawn mowers.

Four-wheel steering systems present a special problem when used for lawn mowers because of the normally sharply defined boundaries of the areas in which the mowers are operated. For example, when a lawn mower is operated along the side of a house a four-wheel steering system for the front and rear wheels can possibly cause the rear of the lawn mower to swing into the side of the house if the wheels are turned to steer away from the house. This is due to the small turning radius provided by four-wheel steering systems. Such steering would be even more dangerous in the case of a mower operating along side of a steep hill. In such instance, the rear of the mower may actually be swung over the side of the hill.

The present invention provides a four-wheel steering system for a vehicle, preferably such as a lawn mower, that has a control system for delaying, at certain instances, steering of the back wheels with respect to the steering of the front wheels.

SUMMARY OF THE INVENTION

The present invention provides a four-wheel steering apparatus for a vehicle. The apparatus of the present invention includes front and rear wheel steering means for respectively steering the front and rear wheels of the vehicle, and a rotatable interconnecting means for connecting the front and rear steering means together to move in relation to one another such that there is a dwell period between certain movement of the front and rear steering means. A control means is operated by a driver of the vehicle to rotate the interconnecting means, and the dwell period of the steering system extends between the time when movement of said front-wheel steering means begins and the time when movement of said rear-wheel steering means begins.

The effect the steering system of the present invention provides is that turning of the vehicle from a straight line direction of movement causes first the front wheels to turn and subsequently, after a predetermined interval of time, causes the rear wheels to turn. Such steering movement of the front and rear wheels is provided by the interconnecting means that is formed of a sector gear associated with the control means and a cam slot associated with said rear wheel steering means. Preferably, the sector gear has to move through a predetermined arc that is preferably an arc of approximately 8° before steering of the rear wheels will be initiated to thereby prevent rapid turning of the rear of the vehicle into contact with a hazard.

DETAILED DESCRIPTION OF THE PREFERRED EMBODIMENT

Figure 1:
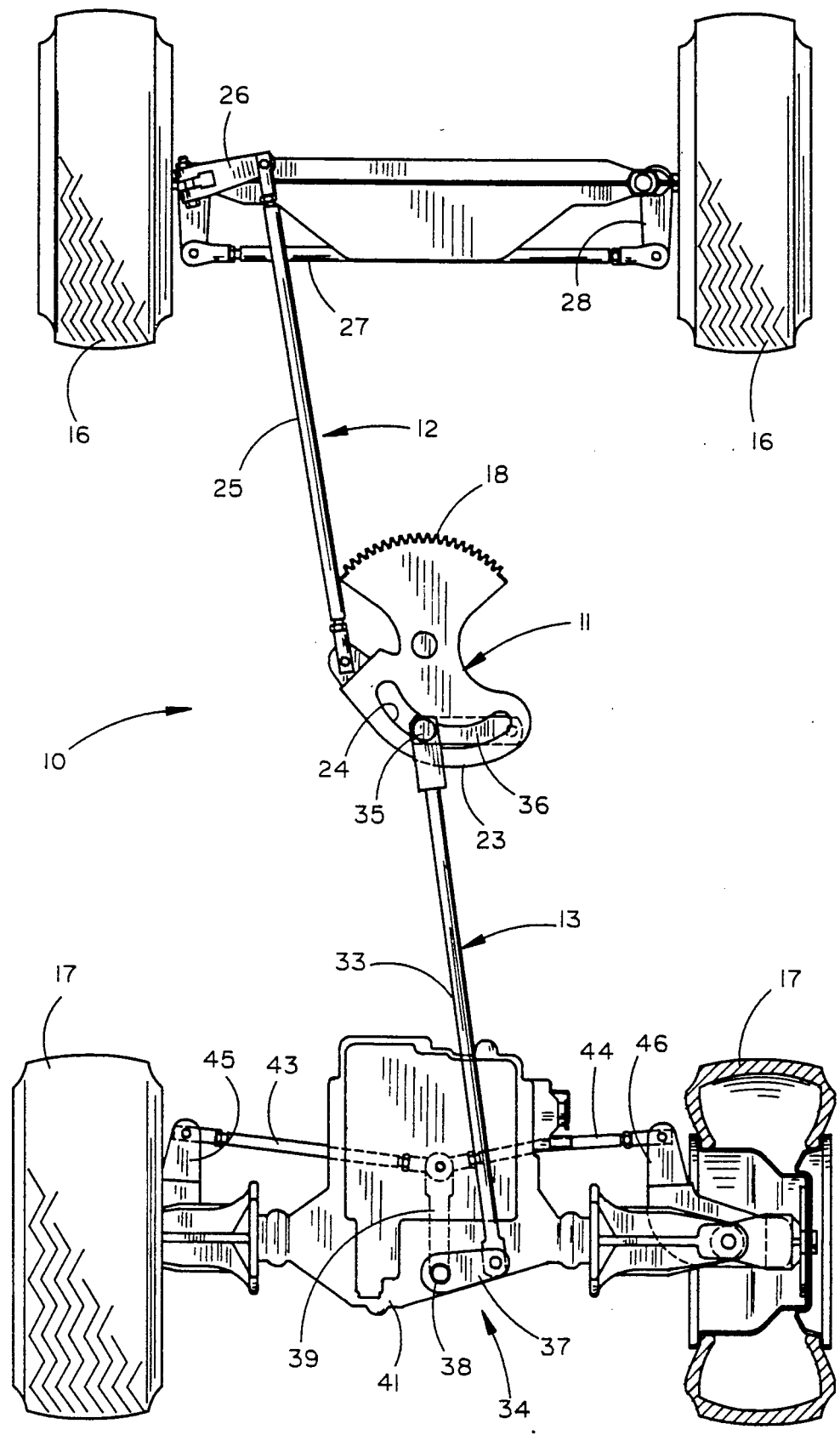
FIG. 1 is a schematic plan view of a first embodiment of the four-wheel steering apparatus of the present invention.

The present invention will be hereinafter described with reference to the drawing in which two preferred embodiments of the invention are shown. The invention is adapted to provide a four-wheel steering apparatus for a vehicle and it is particularly designed to be utilized with slow moving vehicles such as riding lawn mowers or garden tractors.

With reference to FIG. 1, a first preferred embodiment of the steering apparatus of the present invention is shown generally at 10 and is adapted for use with a front engine vehicle. The apparatus 10 comprises a sector gear 11 and front and rear linkage assemblies 12 and 13 respectively for steering front wheels 16 and rear wheels 17.

The sector gear 11 is designed to be pivotally mounted on a bracket, not shown, attached to the undercarriage of the vehicle frame, also not shown, on which the steering apparatus 10 is utilized. The forward end of the sector gear 11 has teeth 18 to engage a pinion gear, not shown, associated with the steering wheel of the vehicle as is well known in the art. A rear portion 23 of the sector gear 11 includes a cam slot 24 that is curve shaped to provide a variable dwell that delays steering of the rear wheels with respect to the steering of the front wheels when turning of the front wheels from a straight line travel position is initiated.

The link assembly 12 has a link arm 25 that extends between the sector gear 11 and a steering lever assembly 26. The steering lever assembly 26 acts as a bell crank to provide positive steering to the left front wheel 16 and also is connected to a tierod 27. The rod 27 is in turn connected to a steering lever 28 for providing a follower type steering to the right front wheel 16.

The link assembly 13 includes a link arm 33 and a rear wheel steering assembly 34. The link arm 33 has a cam roller 35 on its forward end that rides in and is guided by the cam slot 24. To limit the side-to-side movement of the cam 35, preferably a lever arm 36 is pivotally attached at one end to the cam roller 35 and at an opposite end to the bracket assembly for the sector gear 11 and is positioned generally perpendicular to the direction of straight line travel of the vehicle.

When the cam roller 35 is moved in a forward or rearward direction, the link arm 33 moves in correspondence thereto to actuate the rear wheel steering assembly 34. Forming the steering assembly 34 is a lever arm 37 that is pivotally attached at one end to the link arm 33 and is keyed at an opposite end to a rear wheel steering pivot shaft 38.

Figure 2:
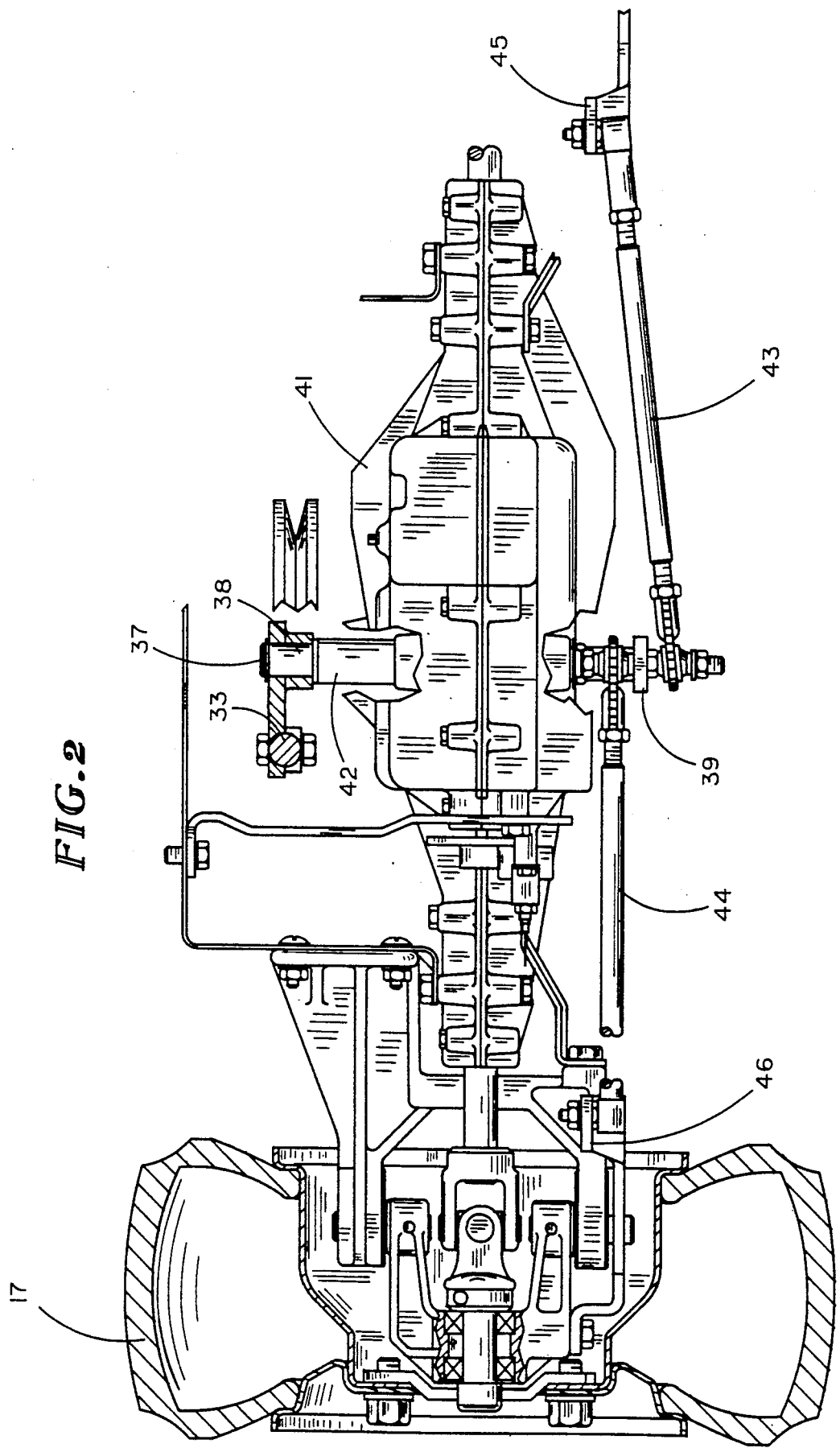
FIG. 2 is a fragmentary cross-sectional view showing a rear portion of the steering apparatus of FIG. 1.

With reference now to both FIGS. 1 and 2, the pivot shaft 38 is journaled in a sleeve type structure 42 formed on the rear portion of a transaxle 41 extending between and connecting together the rear wheels 17. The bottom end of the shaft 38 is keyed to the rear end of another lever arm 39 that extends forwardly from the shaft 38 and is pivotally connected at its forward most end to tie-rods 43 and 44.

Bell cranks 45 and 46 are respectively connected to the tie arms 43 and 44 to serve as lever arms for steering the rear wheels 17. When the sector gear 11 is rotated, either clockwise or counterclockwise, there is relative movement between the cam roller 35 and the cam slot 24. However, due to the shape of the slot 24 such relative movement does no initially actuate the rear wheel steering assembly 34. Instead, the cam slot 24 is shaped to provide forward or rearward movement of the cam roller 35 only after the sector gear has been rotated through a predetermined arc that is preferably at least an arc of approximately 8° from a normal straight forward position.

In this way, when a vehicle on which the apparatus 10 may be employed is driven, steering from a straight forward direction will initially cause the front wheels 16 to turn. But steering of the rear wheels 17 will be delayed so that the rear of the vehicle does move in an outward direction to encounter possible hazards.

Figure 3:
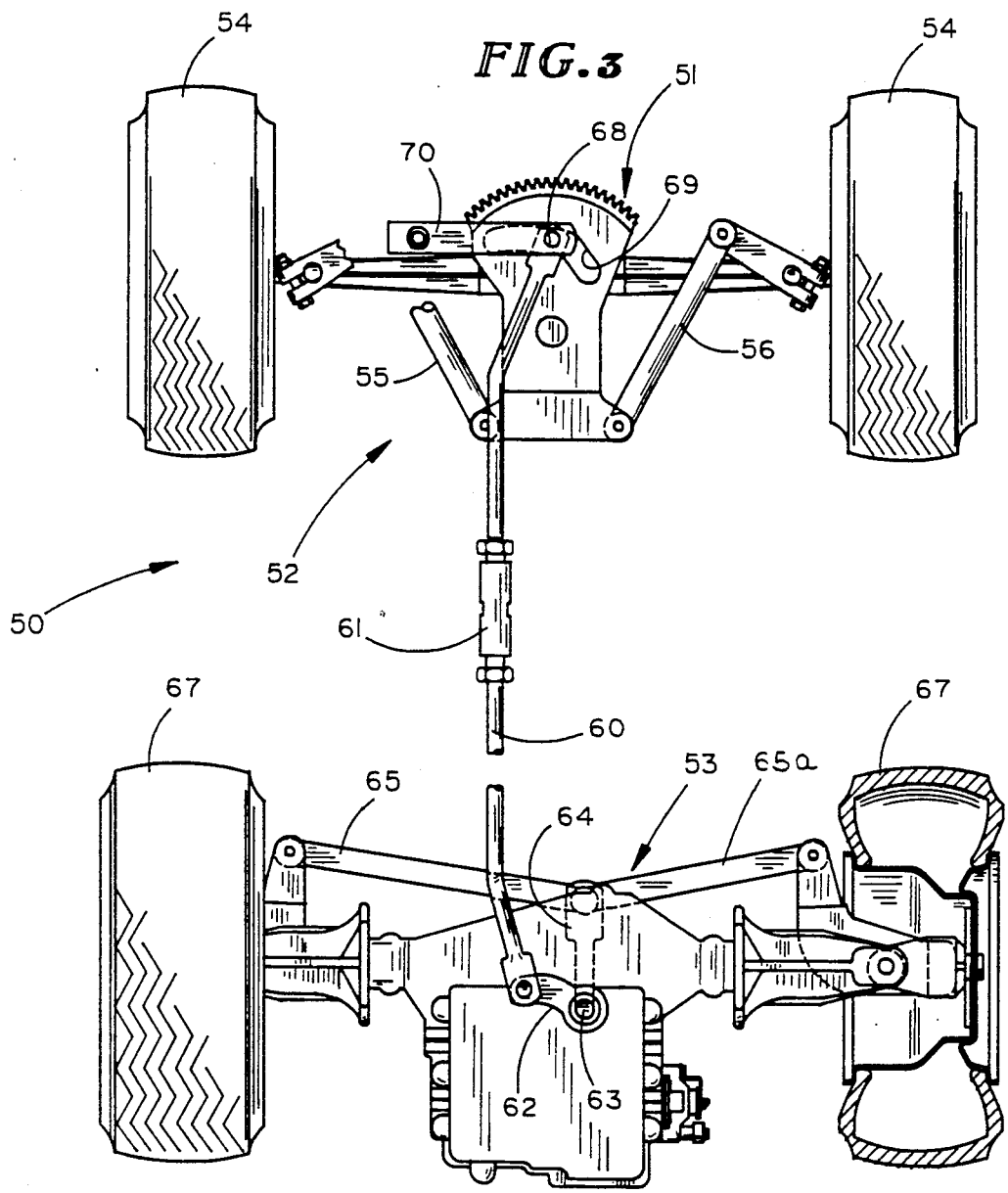
FIG. 3 is a schematic plan view of a second embodiment of the present invention.

Turning now to FIG. 3, a second preferred embodiment of the present invention is shown that provides a steering apparatus 50 for a rear engine drive vehicle. Similar to the first preferred embodiment, the apparatus 50 has a sector gear 51 associated with front and rear steering link assemblies 52 and 53 respectively.

The front link assembly 52 is formed by two pairs of link arms 55 and 56 connecting between the rear portion of the sector gear 51 and front wheels 54. Due to the placement of the engine in the rear, the vehicle's steering wheel, not shown, is located more to the front of the vehicle and accordingly, the steering assembly sector gear 51 generally sits in line with front wheels 54.

Figure 4:
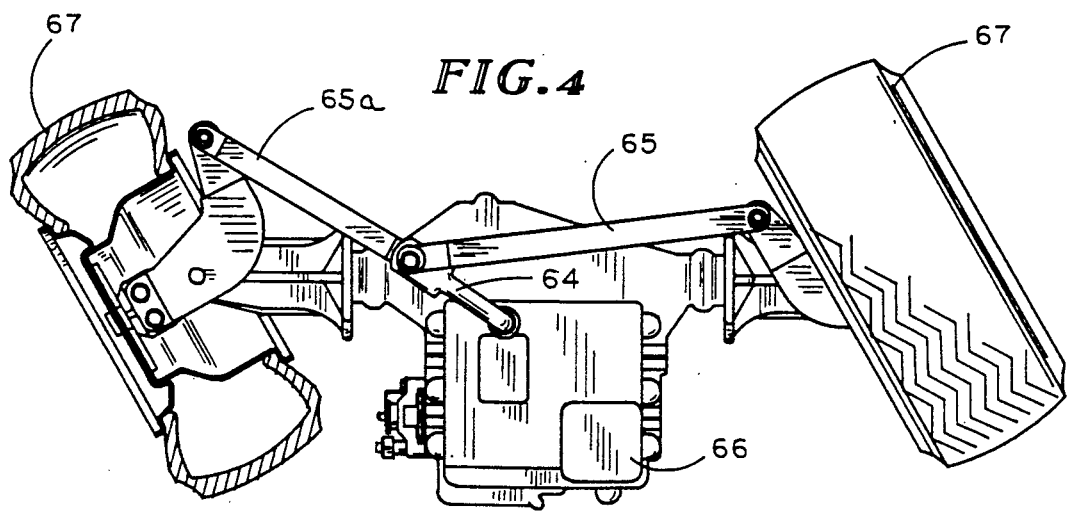
FIG. 4 is a fragmentary cross-sectional view of a rear portion of the steering apparatus of FIG. 3.

The rear link assembly 53 is connected to a steering shaft 60 that extends from the sector gear 51 to the rear and can be varied in length by means of a turn buckle joint 61. The rear link assembly 53 is somewhat similar in structure to the rear link assembly 13 of the first embodiment. Forming the assembly 53 is a lever arm 62 connected to the rear end of the steering shaft 60 and a pivot shaft 63 keyed to the arm 62 and including a lever arm 64 that is attached to tie-rods 65 and 65a. However, in contrast to the assembly 13, the pivot shaft 63 of the assembly 53, is journaled directly through the casing of the transmission of a transaxle 66 extending between rear wheels 67, as best indicated in FIG. 4.

The forward end of the steering shaft 60 includes a cam roller 68 that rides in a curved cam slot 69 in the front portion of the sector gear 51. A lever arm 70 is associated with the cam roller 68 to again limit the side-to-side movement thereof. Just as in the first preferred embodiment, the shape of the cam slot 69 is designed to provide a delayed actuation of the rear wheels until the sector gear 51 has pivoted or rotated through a predetermined arc that is preferably an arc of approximately 8° from its normal straight line travel position.

Thus, it has been shown that the steering apparatus of the present invention is designed for use on both front and rear engine mounted vehicles to provide a steering system that dramatically increases the maneuverability of the vehicle on which it is employed. Furthermore, the invention insures that a vehicle will not be turned so sharply so as to expose the rear portion of the vehicle to possible hazards. Two preferred embodiments of the present invention have been described herein, and it should be apparent to those skilled in the art that modifications and changes may be made in such embodiments without departing from the true spirit and scope of the present invention.

I claim:

1. A four-wheel steering apparatus for controlling the steering of the front and rear wheels of a vehicle, said apparatus comprising:
   (a) rotatable interconnecting means formed of a sector gear having a front portion with teeth and a cam slot formed to the rear of said teeth;
   (b) front wheel steering means for steering the front wheels of said vehicle and having at least one front link assembly attached to said front wheels and said rotatable means;
   (c) rear wheel steering means for steering the rear wheels of the vehicle and having:
      (1) a rear link assembly having one end engaged with the cam slot of said rotatable means and an opposite end;
      (2) a rear wheel steering assembly attached to the opposite end of said rear link assembly and including a rotatable pivot shaft, a pair of tie rods, a first lever arm attached between said rear link assembly and said pivot shaft and a second lever arm attached between said pair of tie rods and said pivot shaft; and
   (d) said rotatable means serving to connect said front and rear steering means together to move in relation to one another such that there is a dwell period between the steering of said front wheels and the steering of said rear wheels due to the engagement of said rear link assembly with said cam slot whereby front wheel steering is initiated immediately upon rotation of said sector gear, but rear wheel steering is delayed until said sector gear is moved through an arc of approximately eight degrees, and thereafter additional movement of said sector gear causes said rear link assembly to act on said first lever arm to turn said pivot shaft and said second lever arm to cause concurrent steering of said front and rear wheels.

2. A four-wheel steering apparatus as recited in claim 1 wherein said cam slot of said rotatable means is arcuate and co-acts with a cam roller of said rear wheel steering means.

3. A four-wheel steering apparatus as recited in claim 1 wherein said rear wheels of said vehicle are connected together by a transaxle and said pivot shaft is journaled in said transaxle to serve as a support for said rear wheel steering means.

4. A four-wheel steering apparatus as recited in claim 1 wherein said pivot shaft is located medially of said rear wheels to enable said tie rods to be approximately of the same length.

* * * * *